US012526192B2

United States Patent
Majjiga et al.

(10) Patent No.: US 12,526,192 B2
(45) Date of Patent: Jan. 13, 2026

(54) SYSTEMS AND METHODS FOR NETWORK SECURITY CONFLICT RESOLUTION

(71) Applicant: Verizon Patent and Licensing Inc., Basking Ridge, NJ (US)

(72) Inventors: Deepak Majjiga, Tirupati West (IN); Neeraj Bhatt, Vienna, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 428 days.

(21) Appl. No.: 18/156,869

(22) Filed: Jan. 19, 2023

(65) Prior Publication Data

US 2024/0250876 A1    Jul. 25, 2024

(51) Int. Cl.
*H04L 41/084* (2022.01)
*H04L 9/40* (2022.01)
*H04W 12/30* (2021.01)
*H04W 16/22* (2009.01)

(52) U.S. Cl.
CPC ........ *H04L 41/0843* (2013.01); *H04L 63/205* (2013.01); *H04W 12/30* (2021.01); *H04W 16/22* (2013.01)

(58) Field of Classification Search
CPC ............... H04L 41/0843; H04L 63/205; H04L 41/0894; H04L 41/0895; H04L 41/145; H04L 63/22; H04W 12/30; H04W 16/22
See application file for complete search history.

(56) References Cited

U.S. PATENT DOCUMENTS

2024/0171545 A1*   5/2024   Majjiga ............... H04L 63/0272

* cited by examiner

*Primary Examiner* — Diane D Mizrahi

(57) ABSTRACT

In some implementations, a design function may receive a corresponding set of security policy indications. The design function may identify a plurality of network slices, each network slice including at least a subset of the set of network functions. The design function may generate at least one graph representing the plurality of network slices and may simulate, using the at least one graph, traffic through the plurality of network slices. Accordingly, the design function may determine a security template based on at least one conflict detected based on the simulating and may transmit the security template for resolving the at least one conflict.

20 Claims, 14 Drawing Sheets

600

SYSTEMS AND METHODS FOR NETWORK SECURITY CONFLICT RESOLUTION

BACKGROUND

Network slicing is a network architecture design technique that allows for customization of network functions to specific applications or groups of applications. For example, different edge functions may be used in different network slices. Additionally, different core network functions may be used in different network slices. Alternatively, at least one core network function may be shared across different network slices.

DETAILED DESCRIPTION OF EXAMPLE EMBODIMENTS

Figure 1A:
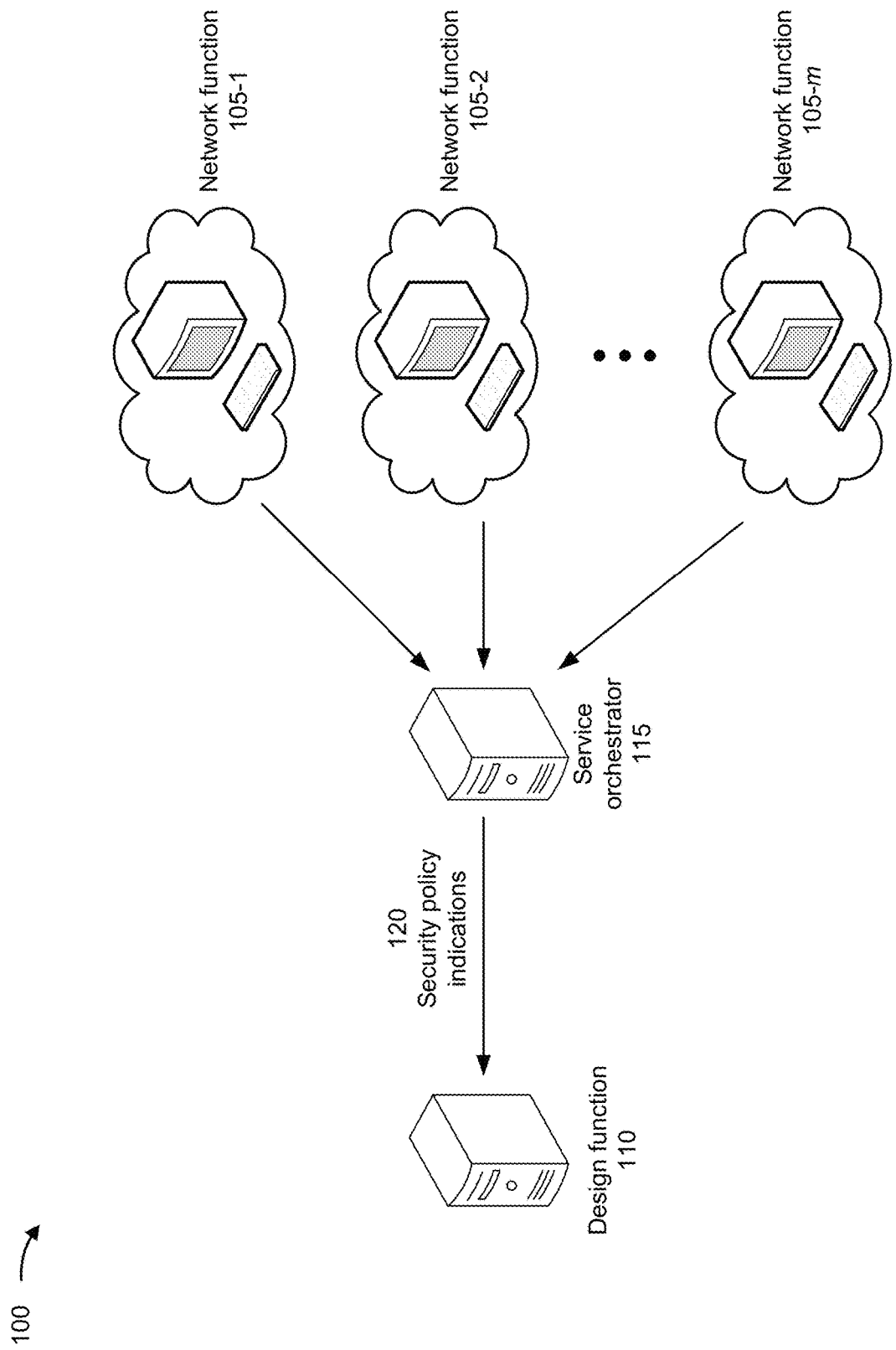
FIGS. 1A-1D are diagrams of an example associated with network security conflict resolution.

The following detailed description of example implementations refers to the accompanying drawings. The same reference numbers in different drawings may identify the same or similar elements.

In wireless networks, such as fifth generation (5G) networks, a radio access network (RAN) includes radio units (RUs) that communicate with user devices, distributed units (DUs) or virtual DUs (vDUs) that control the RUs, and central units (CUs) or virtual CUs (vCUs) that control the DUs. The RAN is controlled by a core network that delivers data to, and receives data from, the user devices via the RAN. The core network includes network functions, such as a user plane function (UPF), a session management function (SMF), an access and mobility management function (AMF), an authentication server function (AUSF), a policy control function (PCF), a charging function (CHF), or a network slice selection function (NSSF), among other examples. Network functions may be deployed at an edge location (and thus referred to as "edge functions") or at a core location (and thus referred to as "core functions"). For example, the UPF, the SMF, and the AMF may be deployed at edge locations in order to reduce latency between those network functions and the RAN. On the other hand, the NSSF, the PCF, and the CHF may be deployed at core locations in order to conserve hardware footprint.

In implementing different network slices for different applications, different edge functions may be used across the network slices. For example, a first network slice may include a first UPF, and a second network slice may include a second UPF. Additionally, different core functions may be used across the network slices. For example, the first network slice may include a first PCF, and the second network slice may include a second PCF. Alternatively, at least one network function (whether an edge function or a core function) may be shared across the network slices. For example, the first network slice and the second network slice may share an AMF.

Each network function implements a security policy to protect against attacks, such as denial of service (DoS) attacks or backdoor attacks, among other examples. For example, a network function may implement a firewall (or a virtual firewall (vFW) when the network function is virtualized), a security group, a network policy (e.g., a Kubernetes® network policy (KNP)), an access control list (ACL), or a combination thereof. Because network functions may be deployed by different users, a first security policy implemented by a first network function may conflict with a second security policy implemented by a second network function.

When a security policy conflict arises, some valid traffic between network functions of a network slice may be blocked. As a result, an end user using an application associated with the network slice may experience latency (e.g., through traffic steering mechanisms or network outage). In some cases, the network slice may block administrator access to a dashboard (e.g., an element management system (EMS)) for configuration and/or optimization, may block access to logs, and/or may block privileged users from virtual private network (VPN) access. Additionally, the network functions will consume additional power, processing resources, and memory overhead in re-transmitting the valid traffic (e.g., using different ports or different Internet protocol (IP) addresses, among other examples, in order to avoid the security policy conflict). For some conflicts, all (or most) traffic may be blocked between the network functions such that the network slice is rendered non-functional. As a result, even more power, processing resources, and memory overhead are consumed in establishing a new network slice for the application.

Detecting and mitigating security policy conflicts therefore avoids network outage and/or reduces latency for the end user. Some implementations described herein enable a design function to identify security policy conflicts and generate a security template to mitigate the conflicts. For example, the design function may transmit the security template to existing network functions so that the existing network functions implement the security template and override the conflicts. Additionally, or alternatively, the design function may transmit the security template to new network functions so that the new network functions implement the security template and avoid conflicts with existing network functions. As a result, valid traffic between network functions of a network slice is allowed, which reduces latency for the end user as well as conserving power, processing resources, and memory overhead that would otherwise have been consumed in re-transmitting the valid traffic. Additionally, conflicts are avoided that would otherwise render the network slice non-functional, which conserves power, processing resources, and memory overhead that would otherwise have been consumed in establishing a new network slice.

FIGS. 1A-1D are diagrams of an example 100 associated with network security conflict resolution. As shown in FIGS. 1A-1D, example 100 includes a set of network functions 105 (e.g., network function 105-1, network function 105-2, . . . , network function 105-m), a design function 110, and a service orchestrator 115.

As shown in FIG. 1A and by reference number 120, the set of network functions 105 may transmit, and the design function 110 may receive, a set of security policy indications corresponding to the set of network functions 105. As further shown in FIG. 1A, the set of network functions 105 may transmit the set of security policy indications to the service orchestrator 115, which, in turn, transmits the set of security policy indications to the design function 110. A security policy indication may include a type indicator (e.g., indicating whether the security policy is a firewall, a security group, a network policy, or an ACL, among other examples). Additionally, a security policy indication may indicate which traffic is allowed (e.g., which ports, IP addresses, and/or devices are allowed) and/or which traffic is blocked (e.g., which ports, IP addresses, and/or devices are blocked).

In some implementations, the set of network functions 105 may transmit, and the design function 110 may receive, a set of registration messages. For example, the set of network functions 105 may register with the design function 110 in order to be included in network slices managed by the design function 110. Additionally, or alternatively, the set of network functions 105 may register with the service orchestrator 115 in order to be included in the network slices. Thus, in some implementations, the service orchestrator 115 may forward the set of registration messages to the design function 110.

Additionally, or alternatively, an administrator associated with the design function 110 (e.g., a network function designer) may provide the set of security policy indications to the design function 110. For example, the administrator may use an input component (e.g., a keyboard, a touchscreen, and/or a mouse, among other examples) to provide the set of security policy indications to the design function 110. The administrator may provide the set of security policy indications directly to the design function 110 or via the service orchestrator 115 (e.g., similarly as described above). In some implementations, the administrator may provide the set of security policy indications during a registration process (e.g., similarly as described above). Alternatively, the administrator may provide the set of security policy indications at a time after the registration process.

Figure 1B:
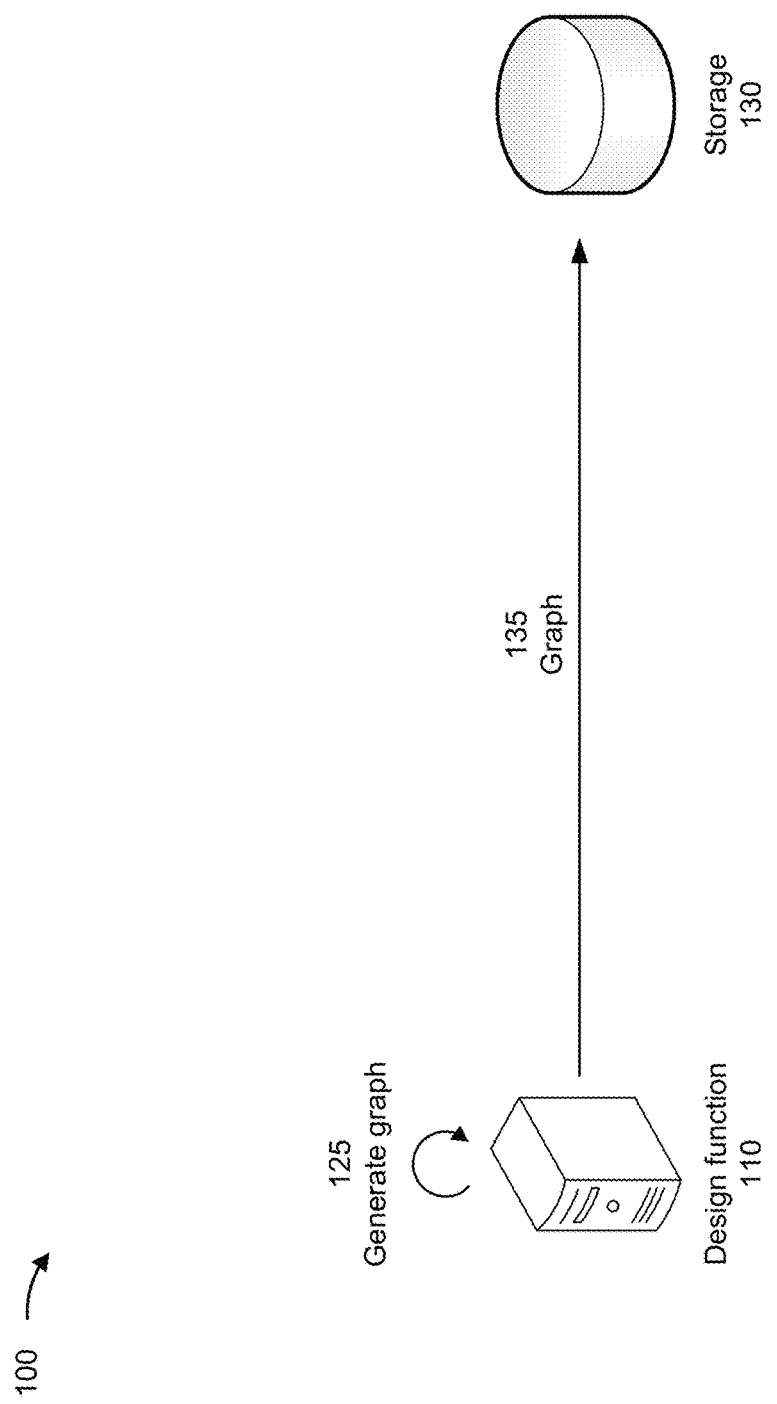

As shown in FIG. 1B and by reference number 125, the design function 110 may generate a graph (e.g., at least one graph) representing a plurality of network slices. For example, the design function 110 may identify the plurality of network slices by identifying combinations of network functions, in the set of network functions 105, that form network slices. For example, the design function 110 may identify a first UPF within the set of network functions 105 and generate the graph showing network slices with the first UPF paired with different SMFs included in the set of network functions 105. In another example, the design function 110 may identify an AMF within the set of network functions 105 and generate the graph showing network slices with the AMF paired with different SMFs included in the set of network functions 105. Therefore, each network slice may include at least a subset out of the set of network functions 105.

In some implementations, as shown by reference number 135, the design function 110 may transmit the graph to a storage 130 associated with the design function 110. The storage 130 may be a memory associated with the design function 110. For example, the storage 130 may be at least partially integrated (e.g., physically, logically, and/or virtually) with the design function 110. Alternatively, the storage 130 may be separate from the design function 110 (e.g., implemented on a cloud storage or on another device remote from the design function 110). Accordingly, the design function 110 may transmit, and the storage 130 may receive, a request to store the graph in a message also including the graph. In some implementations, the storage 130 may be a graph storage such that the design function 110 may feed entries of the graph directly to the storage 130.

Figure 1C:
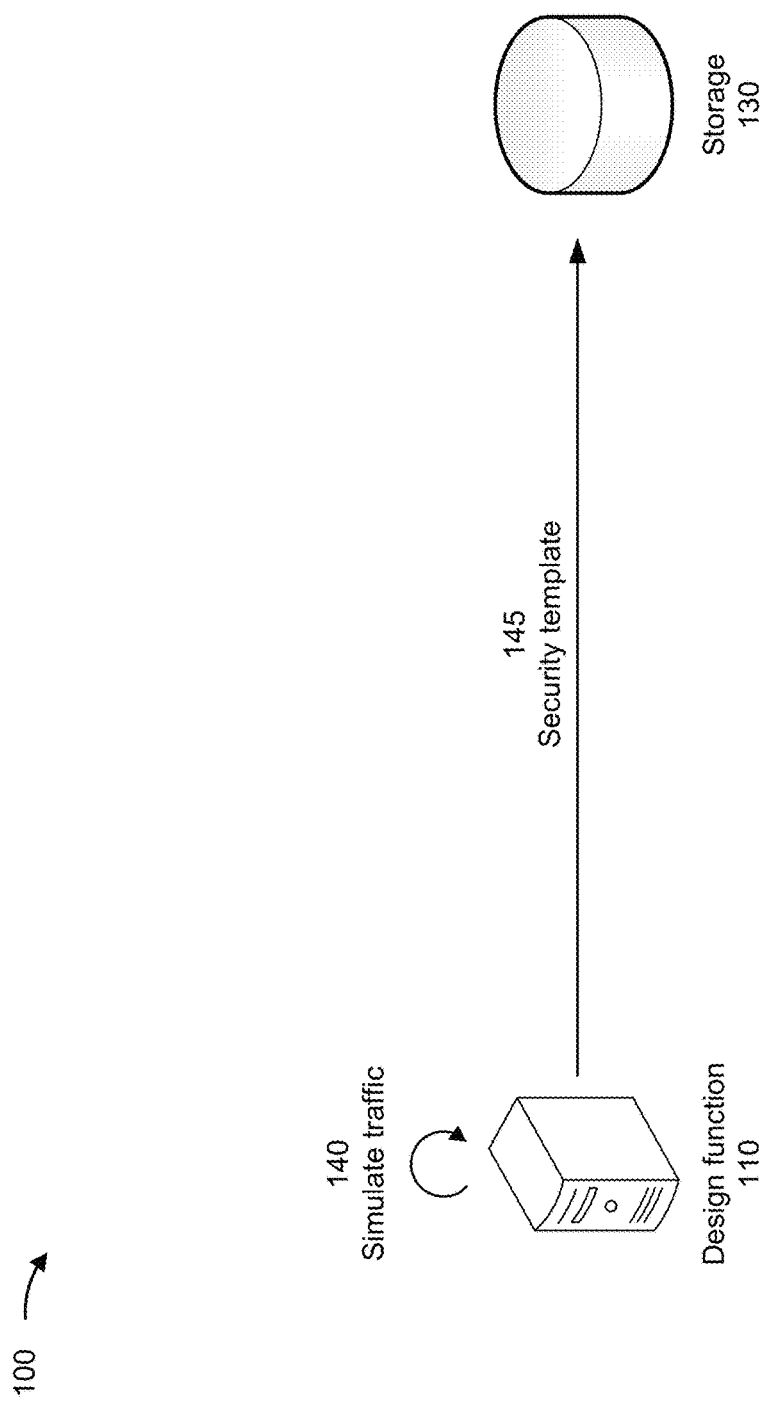

As shown in FIG. 1C and by reference number 140, the design function 110 may simulate traffic through the plurality of network slices. For example, for each network slice, the design function 110 may simulate traffic from an end user into an initial network function of the network slice (e.g., into a UPF or another initial network function) and through additional network functions of the network slice until reaching a terminal network function (e.g., until an AMF or another terminal network function). The simulated traffic may include simulated packets (e.g., when the network slice is associated with a packet-switching network) or simulated messages (e.g., when the network slice is associated with a message-switching network), among other examples.

While running the simulation, the design function 110 simulates application of a security policy at each network function as indicated by the security policy indication associated with the network function. For example, the design function 110 will determine whether the simulated traffic would be allowed or denied by the security policy at the network function. By simulating traffic through each network slice, the design function 110 detects conflicts between security policies of network functions included in a same network slice. For example, the design function 110 may identify a conflict when a packet that is allowed by one network function of a network slice is denied by another network function of the network slice. As a result, security conflicts may be mitigated during runtime to avoid network outages.

Furthermore, the design function 110 may determine a security template based on a conflict (e.g., at least one conflict) detected based on the simulation. In some implementations, the design function 110 may construct a compound security template that indicates a set of priorities associated with the set of security policy indications. For example, the security template may associate a first type of security policy, such as a firewall, with a higher priority than a second type of security policy, such as an ACL. Accordingly, the security template may indicate that a firewall should be applied across any network slice including a network function associated with the firewall. Additionally, the security template may associate the second type of security policy with a higher priority than a priority of a third type of security policy, such as a network policy. Accordingly, the security template may indicate that the ACL should be applied across any network slice including a network function associated with the ACL and excluding any network function associated with the firewall. Therefore, the design function 110 may account for different types of security policies. In some implementations, different types of network functions may deploy different types of security policies. For example, a containerized network function may be associated with a KNP, a virtualized network function may be associated with a vFW, and a physical network function may be associated with an ACL. The different network functions may be deployed in a same data center or across different data centers.

Additionally, or alternatively, the design function 110 may construct a compound security template that indicates a set of priorities associated with the set of network functions. For example, the security template may associate a security policy of a first network function with a higher priority than a priority associated with a security policy of a second network function. Accordingly, the security template may indicate that the security policy of the first network function should be applied across any network slice including the first network function. Additionally, the security template may associate the security policy of the second network function with a higher priority than a priority associated with a security policy of a third network function. Accordingly, the security template may indicate that the security policy of the second network function should be applied across any network slice including the second network function and excluding the first network function. The security template may thus model compound action for security policy executions in sequence across respective tenant spaces that support the set of network functions.

The set of priorities may be provided by the administrators (e.g., similarly as described above for the set of security policy indications). Accordingly, the design function 110 may use the set of priorities in the security template, as described above.

In a combinatory example, the security template may rank types of security policies in combination with network functions. For example, the security template may rank a first type of security policy associated with a first network function above a same type of security policy associated with a second network function, but may also rank the first type of security policy associated with the second network function above a second type of security policy associated with the first network function. Therefore, the security template may indicate that the first type of security policy associated with the first network function should be applied across any network slice including the first network function, but that the first type of security policy associated with the second network function should be applied across any network slice including the second network function as long as the first type of security policy associated with the first network function is unavailable. In other words, when a network function is associated with two (or more) security policy indications, the security template may prioritize one of the security policy indications over another of the security policy indications.

In some implementations, as shown by reference number 145, the design function 110 may transmit the security template to the storage 130. Although the same storage 130 is used for the graph and the security template in example 100, other implementations may use a storage for security templates that is at least partially separate (e.g., physically, logically, and/or virtually) from a storage for graphs.

Figure 1D:
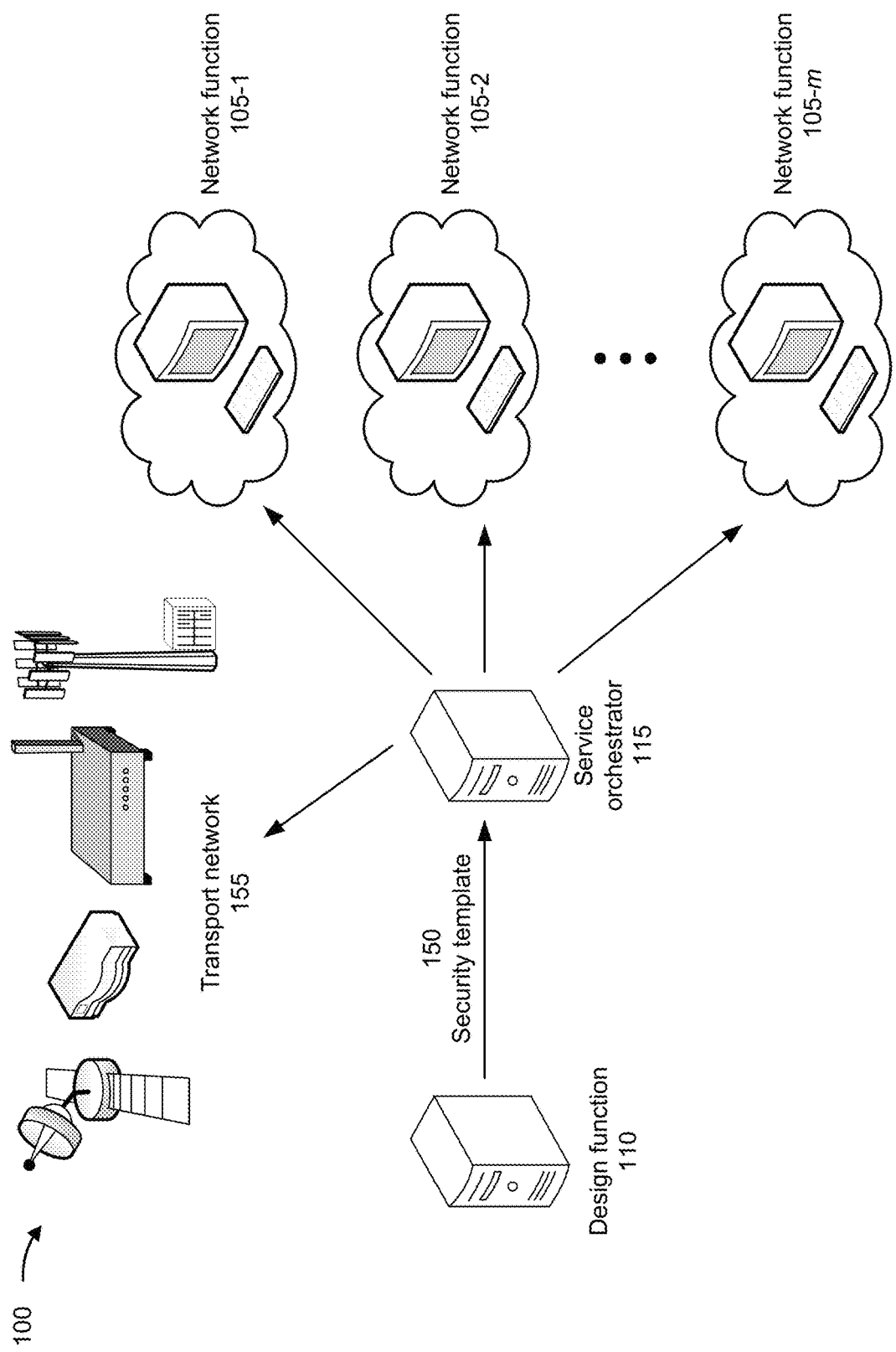

As shown in FIG. 1D and by reference number 150, the design function 110 may transmit the security template for resolving the conflict. In some implementations, the design function 110 may transmit the security template to a transport network 155 for implementation. The transport network 155 may include the hardware and/or software that supports virtualization of the set of network functions 105. Accordingly, the security template may be implemented at a lower level of a network slice. Additionally, or alternatively, the design function 110 may transmit the security template to the set of network functions 105 for implementation. Accordingly, the security template may be implemented at a higher level of a network slice. As further shown in FIG. 1D, the design function 110 may transmit the security template to the service orchestrator 115, which, in turn, transmits the security template to the transport network 155 and/or the set of network functions 105. For example, the service orchestrator 115 may transmit the security template directly to the set of network functions 105 or via configured gateways. Additionally, the service orchestrator 115 may transmit the security template to the transport network 155 via a software-defined network (e.g., software-defined network 405, as described in connection with FIG. 4).

By using techniques as described in connection with FIGS. 1A-1D, the design function 110 may identify security policy conflicts and generate the security template to mitigate the conflicts. For example, the design function 110 may transmit the security template to the set of network functions 105 so that the set of network functions 105 implement the security template and override the conflicts. As a result, valid traffic between network functions of a network slice is allowed, which reduces latency for the end user as well as conserves power, processing resources, and memory overhead that would otherwise have been consumed in re-transmitting the valid traffic. Additionally, conflicts are avoided that would otherwise render the network slice non-functional, which conserves power, processing resources, and memory overhead that would otherwise have been consumed in establishing a new network slice.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

FIGS. 2A-2D are diagrams of an example 200 associated with registering a new network function. As shown in FIGS. 2A-2D, example 200 includes a new network function 105-$n$ (e.g., to be added to a set of network functions 105-1, 105-2, . . . , 105-$m$, such that n is larger than m), a design function 110, and a service orchestrator 115.

Figure 2A:
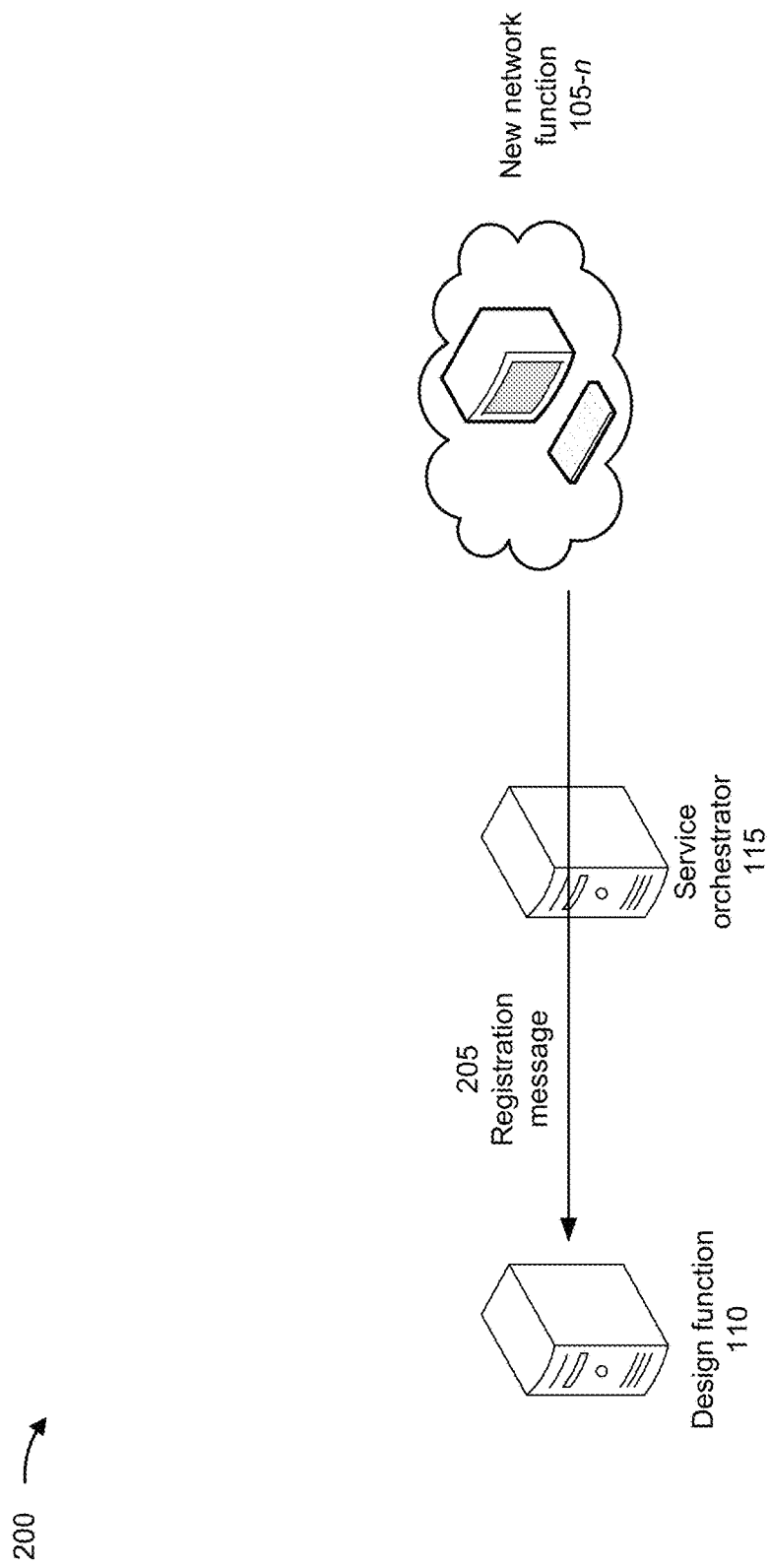
FIGS. 2A-2D are diagrams of an example associated with registering a new network function.

As shown in FIG. 2A and by reference number 205, the new network function 105-$n$ may transmit, and the design function 110 may receive, a registration message. As further shown in FIG. 2A, the new network function 105-$n$ may transmit the registration message to the service orchestrator 115, which, in turn, transmits the registration message to the design function 110. For example, the new network function 105-$n$ may register with the design function 110 (and/or the service orchestrator 115) in order to be included in network slices managed by the design function 110 (and/or the service orchestrator 115).

The registration message may include a security policy indication associated with the new network function 105-$n$. As described in connection with FIG. 1A, a security policy indication may include a type indicator (e.g., indicating whether the security policy is a firewall, a security group, a network policy, or an ACL, among other examples). Additionally, a security policy indication may indicate which traffic is allowed (e.g., which ports, IP addresses, and/or devices are allowed) and/or which traffic is blocked (e.g., which ports, IP addresses, and/or devices are blocked).

Additionally, or alternatively, an administrator associated with the new network function 105-$n$ (e.g., a network function owner) may provide the registration message to the design function 110. For example, the administrator may use an input component (e.g., a keyboard, a touchscreen, and/or a mouse, among other examples) to initiate registration with the design function 110 and thus provide the registration message.

Figure 2B:
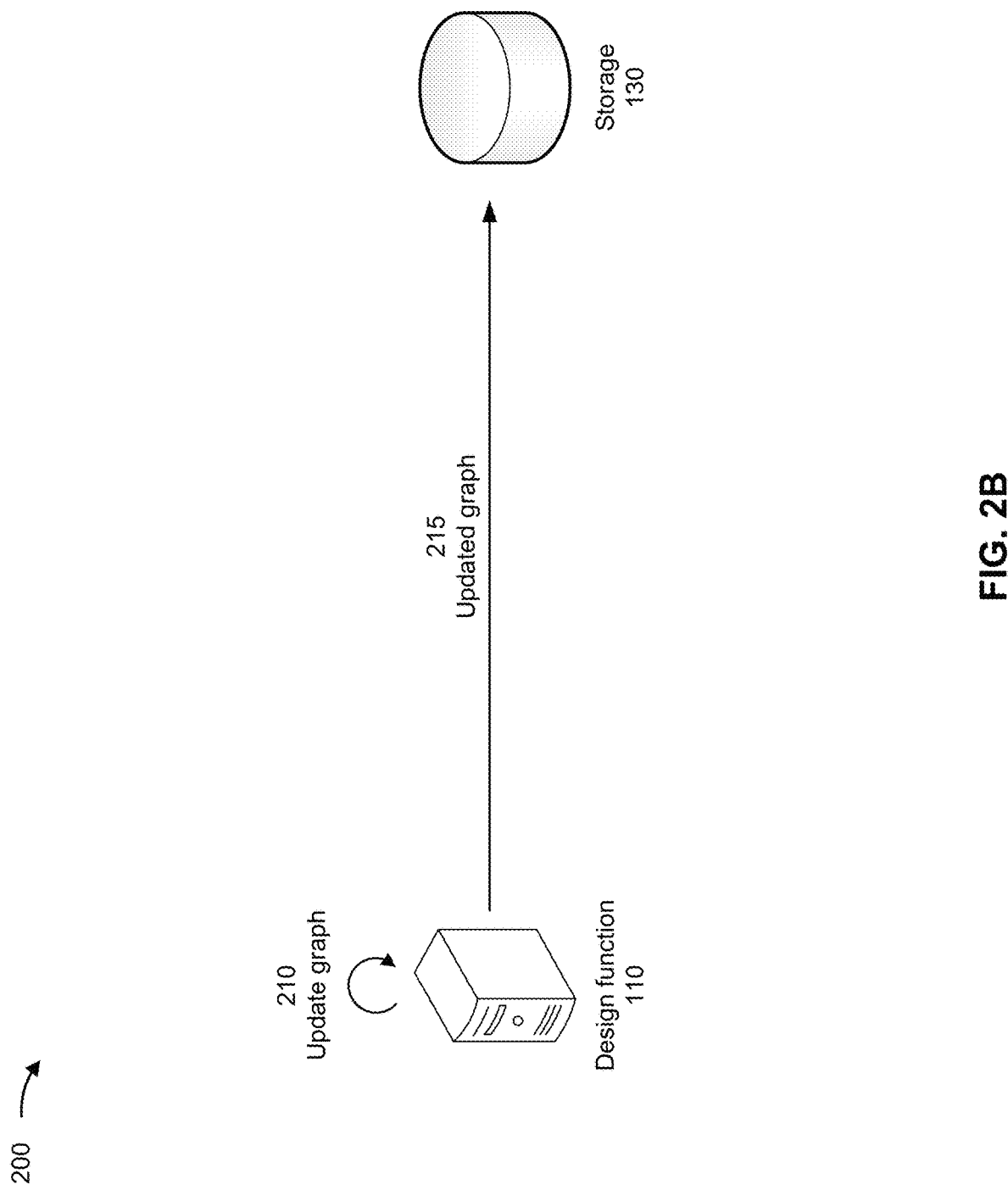

As shown in FIG. 2B and by reference number 210, the design function 110 may update a graph (e.g., at least one graph) representing a plurality of network slices. The design function 110 may have generated an existing graph associated with the set of network functions **105-1, 105-2, . . . , 105-*m* (e.g., as described in connection with FIG. 1B). Accordingly, the design function 110 may receive the existing graph from a storage 130. As described in connection with FIG. 1B, the storage 130 may be a memory associated with the design function 110. For example, the storage 130 may be at least partially integrated (e.g., physically, logically, and/or virtually) with the design function 110. Alternatively, the storage 130 may be separate from the design function 110 (e.g., implemented on a cloud storage or on another device remote from the design function 110). Accordingly, the design function 110 may transmit, and the storage 130 may receive, a request for the existing graph, and the storage 130 may transmit, and the design function 110 may receive, the existing graph in response to the request. In some implementations, the design function 110 may execute a query on the storage 130 (e.g., when the storage 130 is a graph storage) and apply one or more filters (e.g., filtering by network slice identifier and/or a location of the new network function 105-*n***, among other examples) in order to receive the existing graph.

The design function 110 may update the graph based on the new network function **105-*n*. For example, the design function 110 may identify new network slices by identifying combinations of the new network function 105-*n* with other network functions, in the set of network functions 105-1, 105-2, . . . , 105-*m*, that form the new network slices. Accordingly, the new network function 105-*n* may be represented by a new node in the updated graph, and the new network slices may be represented by new possible paths within the updated graph. In some implementations, as shown by reference number 215, the design function 110 may transmit the updated graph to the storage 130 associated with the design function 110**.

Figure 2C:
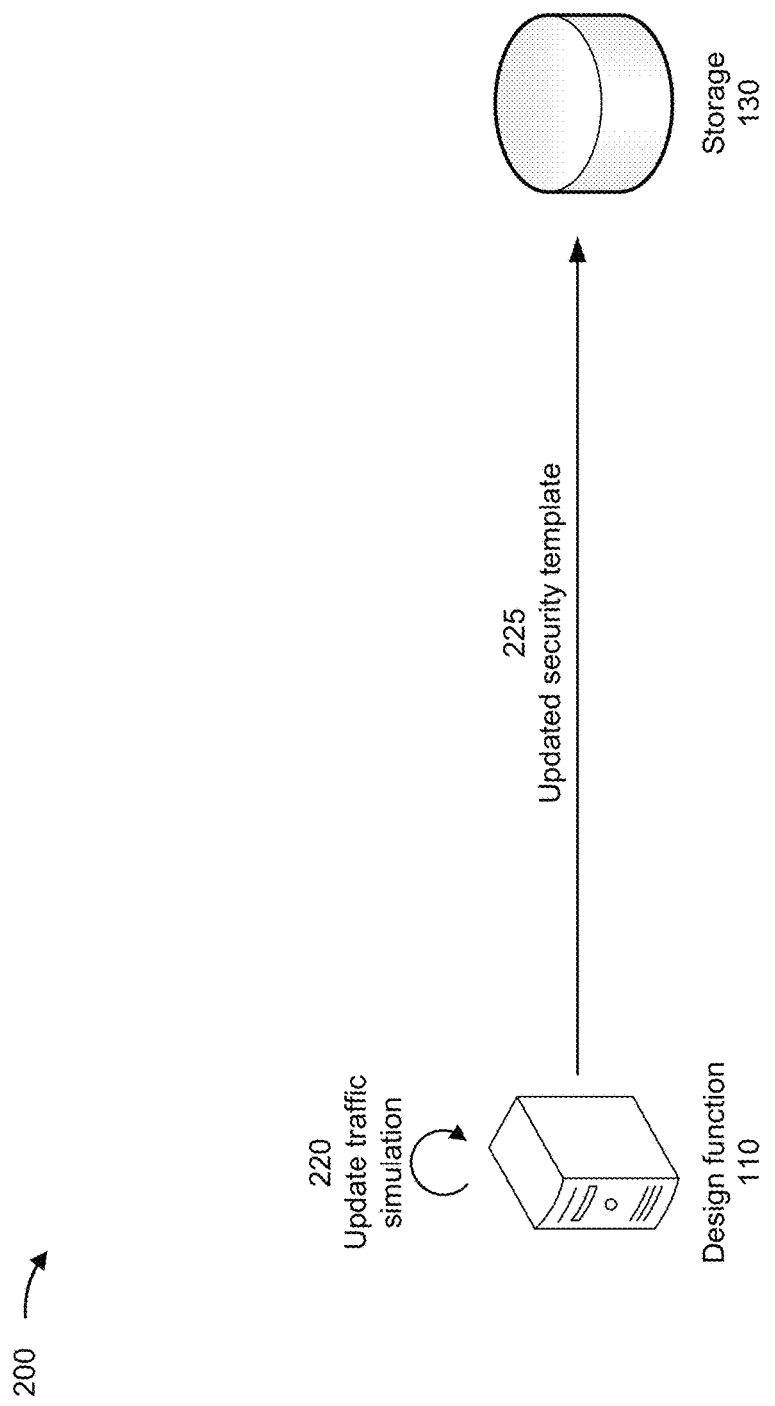

As shown in FIG. 2C and by reference number 220, the design function 110 may update a simulation of traffic using the updated graph. For example, the design function 110 may have simulated traffic through the original graph as described in connection with FIG. 1C. Accordingly, for each new network slice, the design function 110 may simulate traffic from an end user into an initial network function of the new network slice (e.g., into a UPF or another initial network function) and through additional network functions of the network slice until a terminal network function (e.g., until an AMF or another terminal network function) is reached. The simulated traffic may include simulated packets (e.g., when the network slice is associated with a packet-switching network) or simulated messages (e.g., when the network slice is associated with a message-switching network), among other examples.

While running the updated simulation, the design function 110 simulates application of a security policy at each network function as indicated by the security policy indication associated with the new network function. By simulating traffic through each network slice, the design function 110 detects any new conflicts between existing security policies (e.g., associated with network functions in the set of network functions **105-1, 105-2, . . . , 105-*m*) and a security policy of the new network function 105-*n*. For example, the design function 110 may identify a new conflict when a packet allowed by a network function in the set of network functions 105-1, 105-2, . . . , 105-*m* is denied by the new network function 105-*n***.

Furthermore, the design function 110 may update a security template based on a new conflict (e.g., at least one new conflict) detected based on the updated simulation. The design function 110 may have generated an existing security template associated with the set of network functions **105-1, 105-2, . . . , 105-*m* (e.g., as described in connection with FIG. 1C). Accordingly, the design function 110 may receive the existing security template from the storage 130. Although the same storage 130 is used for the existing graph and the existing security template in example 200**, other implementations may use a storage for security templates that is at least partially separate (e.g., physically, logically, and/or virtually) from a storage for graphs.

As described in connection with FIG. 1C, the design function 110 may place a security policy associated with the new network function **105-*n* within an existing ranking structure of the security template. For example, the security policy associated with the new network function 105-*n* may be prioritized above some security policies associated with the set of network functions 105-1, 105-2, . . . , 105-*m* and prioritized below other security policies associated with the set of network functions 105-1, 105-2, . . . , 105-*m*. When the new network function 105-*n* is associated with multiple security policies (e.g., security policies of different types), the design function 110 may place the multiple security policies separately within the existing ranking structure. For example, a security policy associated with the new network function 105-*n* and of a first type may be associated with a different priority than a security policy associated with the new network function 105-*n* and of a second type. In some implementations, as shown by reference number 225, the design function 110 may transmit the updated security policy to the storage 130 associated with the design function 110**.

Figure 2D:
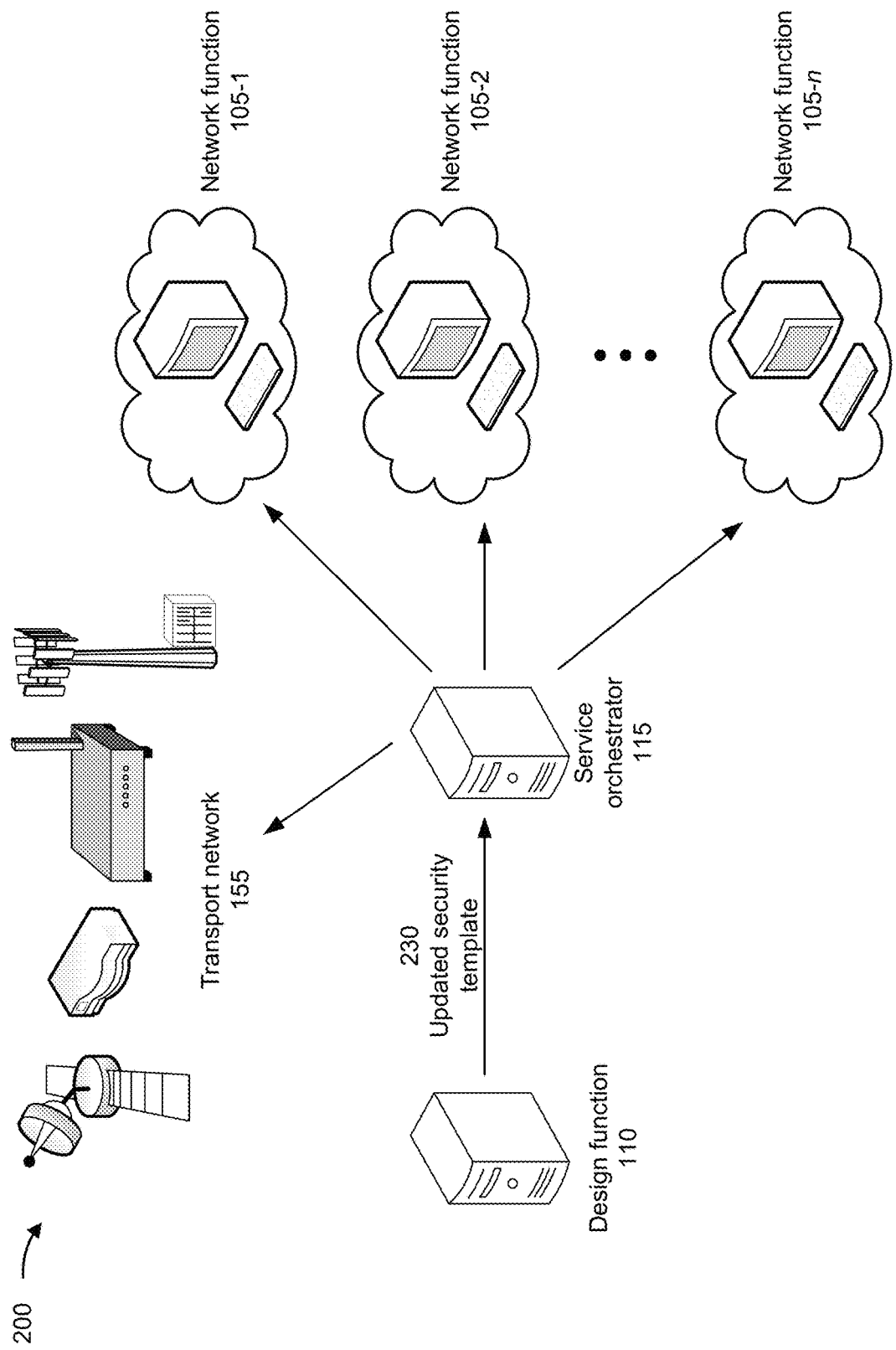

As shown in FIG. 2D and by reference number 230, the design function 110 may transmit the updated security template for resolving the new conflict. In some implementations, the design function 110 may transmit the updated security template to a transport network 155 for implementation. As described in connection with FIG. 1D, the transport network 155 may include the hardware and/or software that supports virtualization of the set of network functions **105-1, 105-2, . . . , 105-*n*. Accordingly, the updated security template may be implemented at a lower level of a network slice. Additionally, or alternatively, the design function 110 may transmit the updated security template to the set of network functions 105-1, 105-2, . . . , 105-*n* for implementation. Accordingly, the updated security template may be implemented at a higher level of a network slice. As further shown in FIG. 2D, the design function 110 may transmit the security template to the service orchestrator 115, which, in turn, transmits the security template to the transport network 155 and/or the set of network functions 105-1, 105-2, . . . , 105-*n***.

By using techniques as described in connection with FIGS. 2A-2D, the design function 110 may scan for new security policy conflicts and update the security template to mitigate the new conflicts. For example, the design function 110 may transmit the updated security template to the set of network functions 105 so that the set of network functions 105 implement the updated security template and override the new conflicts. As a result, valid traffic between network functions of a network slice is allowed, which reduces latency for the end user and conserves power, processing resources, and memory overhead that would otherwise have been consumed in re-transmitting the valid traffic. Additionally, conflicts are avoided that would otherwise render the network slice non-functional, which conserves power, processing resources, and memory overhead that would otherwise have been consumed in establishing a new network slice.

As indicated above, FIGS. 2A-2D are provided as an example. Other examples may differ from what is described with regard to FIGS. 2A-2D. The number and arrangement of devices shown in FIGS. 2A-2D are provided as an example. In practice, there may be additional devices, fewer devices, different devices, or differently arranged devices than those shown in FIGS. 2A-2D. Furthermore, two or more devices shown in FIGS. 2A-2D may be implemented within a single device, or a single device shown in FIGS. 2A-2D may be implemented as multiple, distributed devices. Additionally, or alternatively, a set of devices (e.g., one or more devices) shown in FIGS. 2A-2D may perform one or more functions described as being performed by another set of devices shown in FIGS. 2A-2D.

Figure 3A:
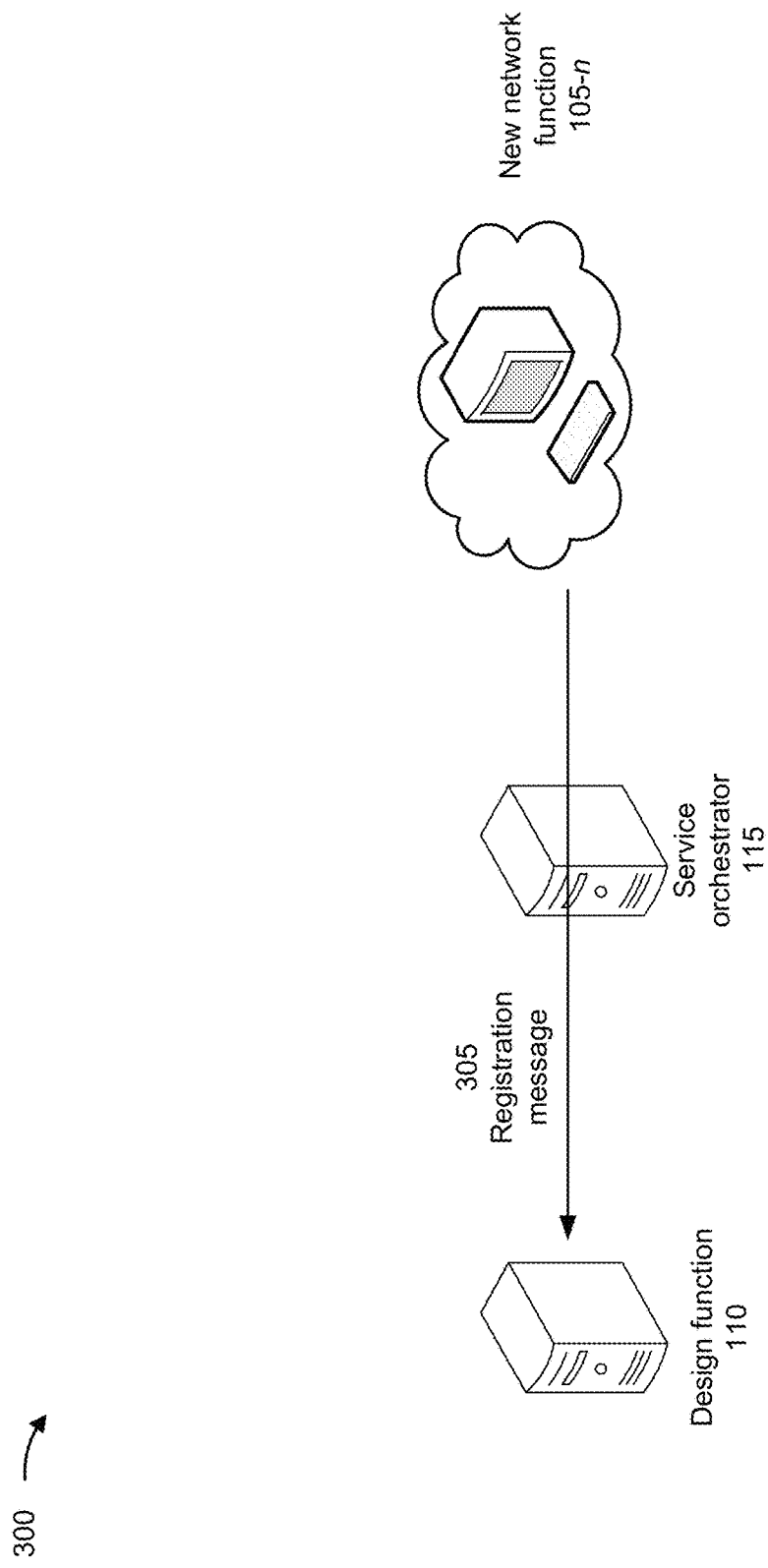
FIGS. 3A-3B are diagrams of an example associated with registering a new network function.
Figure 3B:
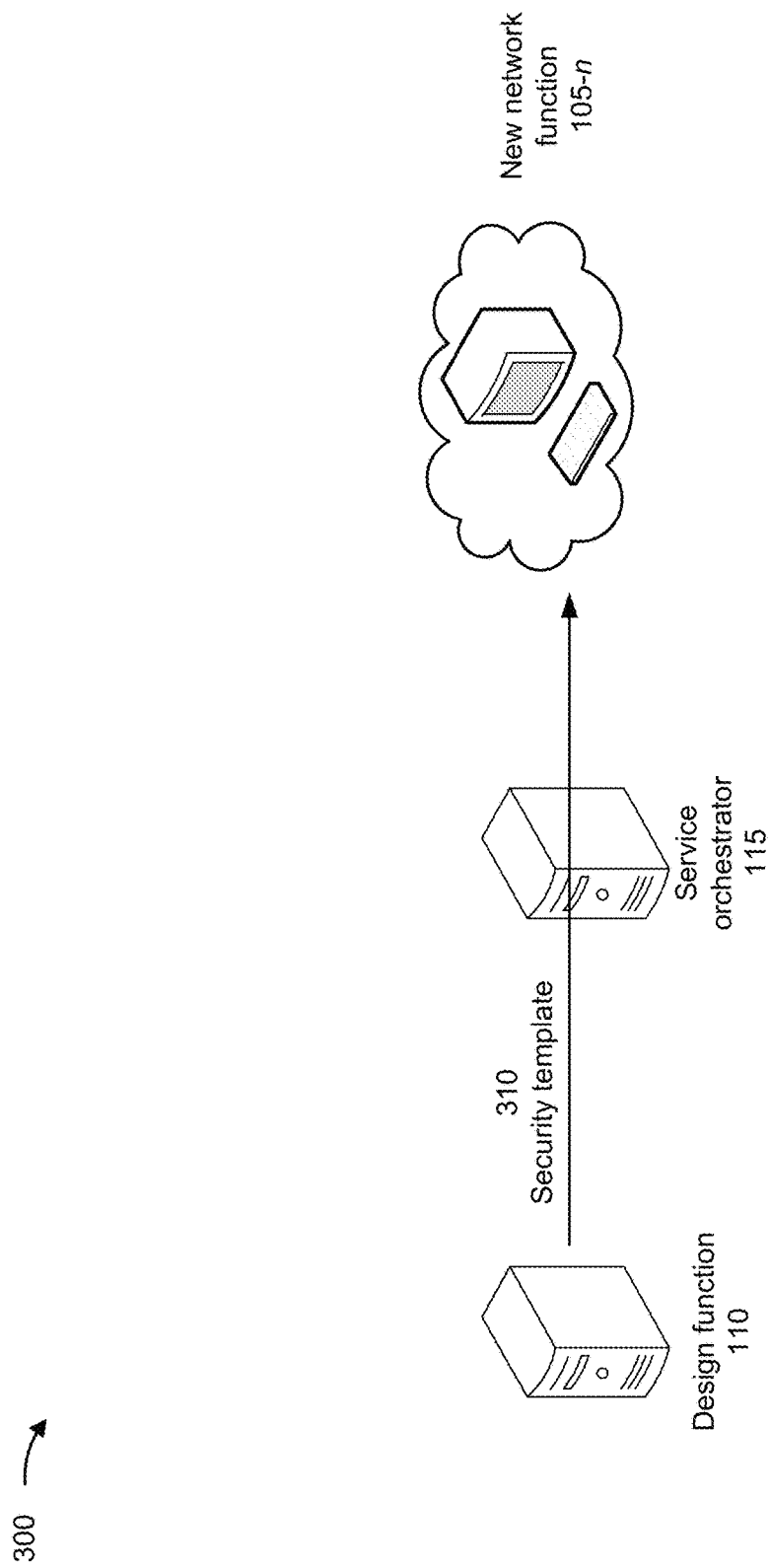

FIGS. 3A-3B are diagrams of an example 300 associated with registering a new network function. As shown in FIGS. 3A-3B, example 300 includes a new network function 105-*n* (e.g., to be added to a set of network functions 105-1, 105-2, . . . , 105-*m*, such that n is larger than m), a design function 110, and a service orchestrator 115.

As shown in FIG. 3A and by reference number 305, the new network function 105-*n* may transmit, and the design function 110 may receive, a registration message. As further shown in FIG. 3A, the new network function 105-*n* may transmit the registration message to the service orchestrator 115, which, in turn, transmits the registration message to the design function 110. For example, the new network function 105-*n* may register with the design function 110 (and/or the service orchestrator 115) in order to be included in network slices managed by the design function 110 (and/or the service orchestrator 115).

Additionally, or alternatively, an administrator associated with the new network function 105-*n* (e.g., a network function owner) may provide the registration message to the design function 110. For example, the administrator may use an input component (e.g., a keyboard, a touchscreen, and/or a mouse, among other examples) to initiate registration with the design function 110 and thus provide the registration message.

As shown in FIG. 3B and by reference number 310, the new network function 105-*n* is not yet associated with a security policy, and the design function 110 may transmit, and the new network function 105-*n* may receive, a security template to implement. For example, the design function 110 may have generated the security template associated with the set of network functions 105-1, 105-2, . . . , 105-*m*, as described in connection with FIG. 1C. Accordingly, in some implementations, the design function 110 may receive the security template from a storage 130 (not shown in FIGS. 3A-3B).

Additionally, or alternatively, the design function 110 may transmit the security template to a transport network 155 (not shown in FIGS. 3A-3B) for implementation. As described in connection with FIG. 1D, the transport network 155 may include the hardware and/or software that supports virtualization of the new network function 105-*n*.

By using techniques as described in connection with FIGS. 3A-3B, the design function 110 may register the new network function 105-*n* and transmit the security template to the new network function 105-*n*, such that the new network function 105-*n* implements the security template and avoids conflicts with the set of network functions 105-1, 105-2, . . . , 105-*m*. As a result, valid traffic between network functions of a network slice is allowed, which reduces latency for the end user as well as conserving power, processing resources, and memory overhead that would otherwise have been consumed in re-transmitting the valid traffic. Additionally, conflicts are avoided that would otherwise render the network slice non-functional, which conserves power, processing resources, and memory overhead that would otherwise have been consumed in establishing a new network slice.

As indicated above, FIGS. 3A-3B are provided as an example. Other examples may differ from what is described with regard to FIGS. 3A-3B. The number and arrangement of devices shown in FIGS. 3A-3B are provided as an example. In practice, there may be additional devices, fewer devices, different devices, or differently arranged devices than those shown in FIGS. 3A-3B. Furthermore, two or more devices shown in FIGS. 3A-3B may be implemented within a single device, or a single device shown in FIGS. 3A-3B may be implemented as multiple, distributed devices. Additionally, or alternatively, a set of devices (e.g., one or more devices) shown in FIGS. 3A-3B may perform one or more functions described as being performed by another set of devices shown in FIGS. 3A-3B.

Figure 4:
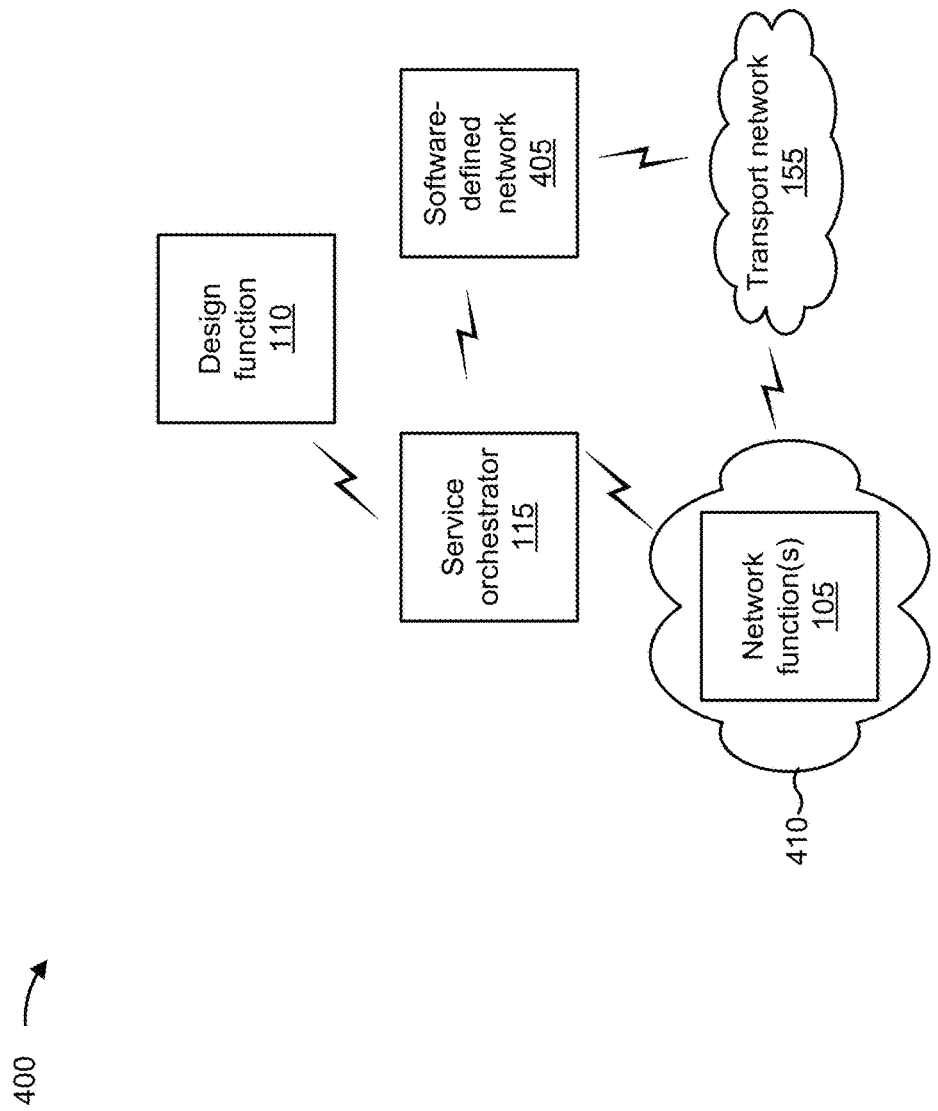
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a set of network functions 105, a design function 110, a service orchestrator 115, a transport network 155, a software-defined network 405, and a cloud environment 410. Devices of environment 400 may interconnect via wired connections, wireless connections, or a combination of wired and wireless connections.

The set of network functions 105 may be implemented on one or more devices capable of receiving, processing, storing, routing, and/or providing traffic (e.g., a packet and/or other information or metadata) in a manner described herein. For example, the set of network functions 105 may be implemented on a router, such as a label switching router (LSR), a label edge router (LER), an ingress router, an egress router, a provider router (e.g., a provider edge router or a provider core router), a virtual router, or another type of router. Additionally, or alternatively, the set of network functions 105 may be implemented on a gateway, a switch, a firewall, a hub, a bridge, a reverse proxy, a server (e.g., a proxy server, a cloud server, or a data center server), a load balancer, and/or a similar device. In some implementations, the set of network functions 105 may be implemented on a physical device implemented within a housing, such as a chassis. In some implementations, the set of network functions 105 may be implemented on a virtual device implemented by one or more computing devices of a cloud computing environment or a data center. For example, as shown in FIG. 4, the set of network functions 105 may be implemented in the cloud environment 410. In some implementations, the set of network functions 105 may be implemented on a group of data center nodes that are used to route traffic flow through a network. As shown in FIG. 4, the set of network functions 105 may be managed by the service orchestrator 115. Additionally, the set of network functions 105 may manage the flow of data across the transport network 155.

The design function 110 may include one or more devices capable of receiving, generating, storing, processing, providing, and/or routing information associated with the set of network functions 105, as described elsewhere herein. The design function 110 may include a communication device and/or a computing device. For example, the design function 110 may include a server, such as an application server, a client server, a web server, a database server, a host server, a proxy server, a virtual server (e.g., executing on computing hardware), or a server in a cloud computing system. In some implementations, the design function 110 may include computing hardware used in a cloud computing environment. As shown in FIG. 4, the design function 110 may include a service design center (e.g., as defined in the open network automation platform (ONAP) hosted by The Linux Foundation®) or another service that manages the set of network functions 105 via the service orchestrator 115.

The service orchestrator 115 may include one or more devices capable of receiving, generating, storing, processing, providing, and/or routing information associated with the set of network functions 105, as described elsewhere herein. The service orchestrator 115 may include a communication device and/or a computing device. For example, the service orchestrator 115 may include a server, such as an application server, a client server, a web server, a database server, a host server, a proxy server, a virtual server (e.g., executing on computing hardware), or a server in a cloud computing system. In some implementations, the service orchestrator 115 may include computing hardware used in a cloud computing environment. For example, the service orchestrator 115 may include a service orchestration service (e.g., as defined in the ONAP hosted by The Linux Foundation) or another service that manages host software (e.g., virtualization environments) for the set of network functions 105. Accordingly, the design function 110 uses the service orchestrator 115 to receive information from, and transmit commands to, the set of network functions 105.

The transport network 155 may include infrastructure (e.g., hardware and/or software) that moves information across the network as managed by the set of network functions 105. For example, the transport network 155 may include network switches (e.g., border leaf switches and/or spine switches, among other examples), routers, fiber, or other similar components. Controllers of the transport network 155 may be implemented in hardware, software, or a combination thereof. Accordingly, the transport network 155 may implement network slices that are designed by the design function 110 and implemented by at least a subset of the set of network functions 105. As further shown in FIG. 4, the transport network 155 may be managed by a software-defined network 405. For example, the service orchestrator 115 may manage host software (e.g., virtualization environments) for the software-defined network 405. Accordingly, the design function 110 uses the service orchestrator 115 to receive information from, and transmit commands to, the transport network 155.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
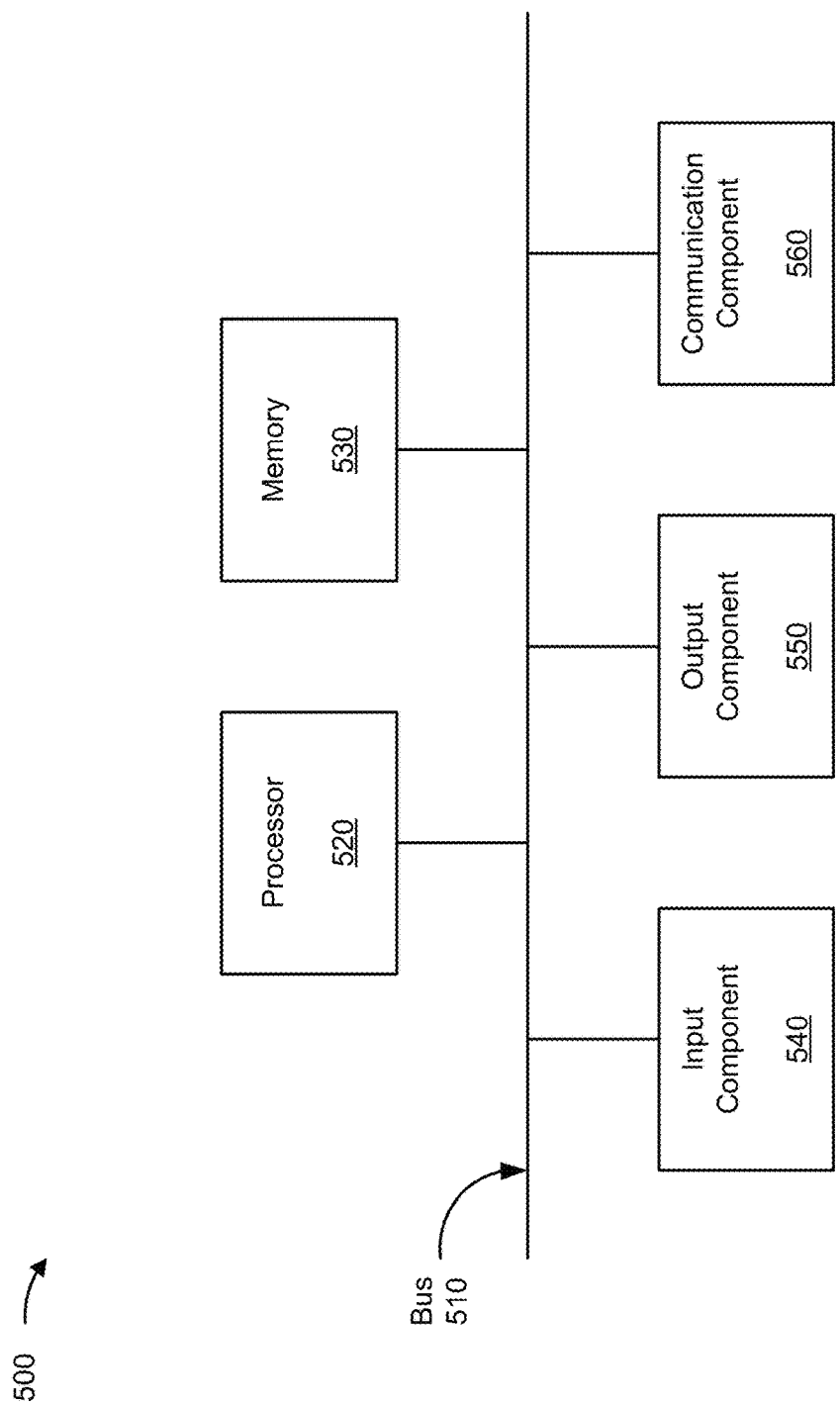
FIG. 5 is a diagram of example components of one or more devices of FIG. 4.

FIG. 5 is a diagram of example components of a device 500 associated with network security conflict resolution. The device 500 may correspond to a network function 105, a design function 110, a service orchestrator 115, a transport network 155, and/or a device implementing a software-defined network 405. In some implementations, the network function 105, the design function 110, the service orchestrator 115, the transport network 155, and/or the device implementing the software-defined network 405 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
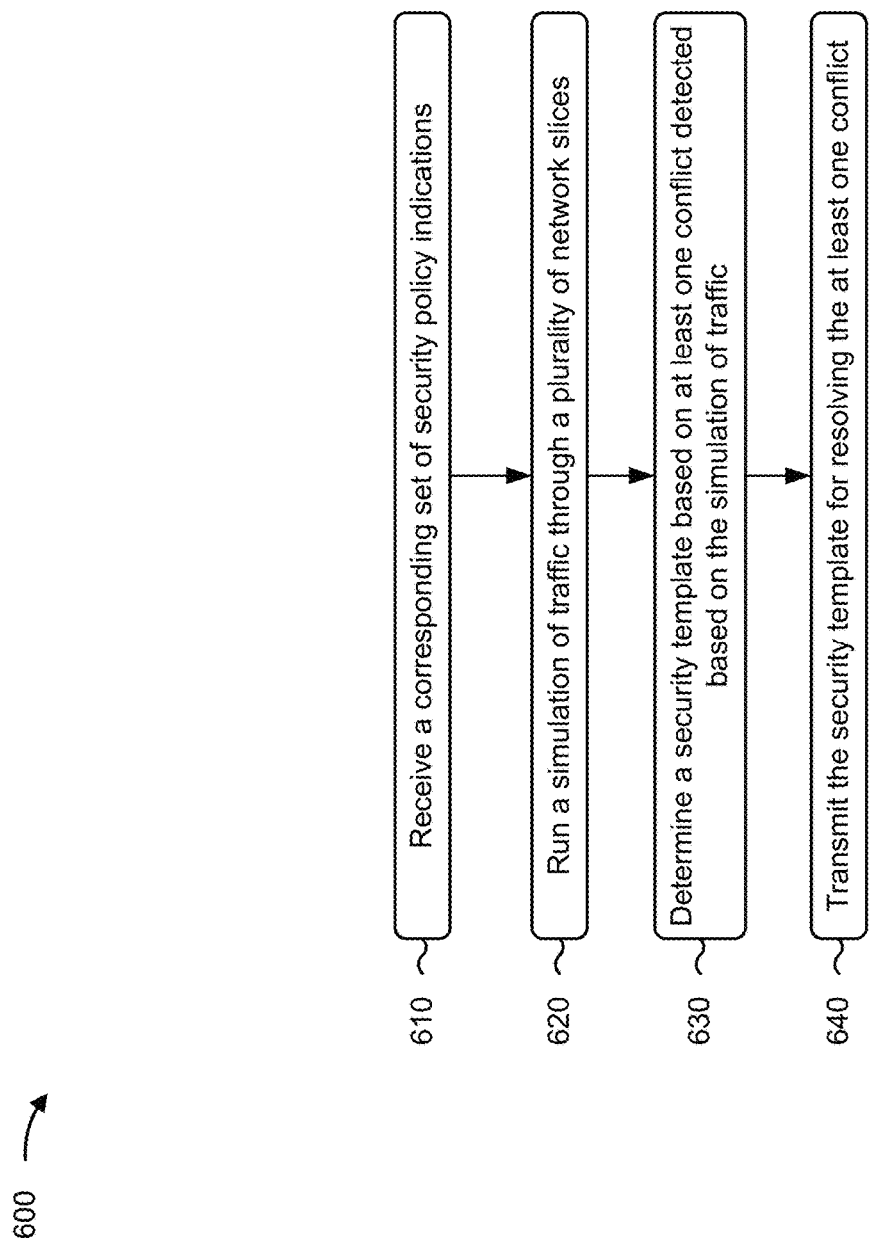
FIG. 6 is a flowchart of an example process associated with network security conflict resolution.

FIG. 6 is a flowchart of an example process 600 associated with network security conflict resolution. In some implementations, one or more process blocks of FIG. 6 may be performed by a design function (e.g., design function 110). In some implementations, one or more process blocks of FIG. 6 may be performed by another device or a group of devices separate from or including the design function, such as a network function 105, a service orchestrator 115, a transport network 155, and/or a device implementing a software-defined network 405. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving a corresponding set of security policy indications (block 610). For example, the design function may receive a corresponding set of security policy indications, as described herein. In some implementations, the design function may receive a set of registration messages that includes the set of security policy indications. The set of security policy indications may be associated with a single type of security policy or may be associated with a plurality of types of security policies.

As further shown in FIG. 6, process 600 may include running a simulation of traffic through a plurality of network slices (block 620). For example, the design function may run a simulation of traffic through a plurality of network slices, as described herein. Each network slice may include at least a subset of the set of network functions. In some implementations, the design function may identify the plurality of network slices and generate at least one graph representing the plurality of network slices. Accordingly, the design function may simulate traffic through the plurality of network slices using the at least one graph.

In some implementations, process 600 further includes storing the at least one graph in a memory associated with the design function. Accordingly, the design function may update the at least one graph based on a new security policy indication from a new network function, as described herein.

As further shown in FIG. 6, process 600 may include determining a security template based on at least one conflict detected based on the simulation of traffic (block 630). For example, the design function may determine a security template based on at least one conflict detected based on the simulation of traffic, as described herein. In some implementations, the design function may construct a compound security template that indicates a set of priorities associated with the set of network functions. Additionally, or alternatively, the design function may construct a compound security template that indicates a set of priorities associated with the set of security policy indications.

As further shown in FIG. 6, process 600 may include transmitting the security template for resolving the at least one conflict (block 640). For example, the design function may transmit the security template for resolving the at least one conflict, as described herein. In some implementations, the design function may transmit the security template to a transport network associated with the plurality of network slices. Additionally, or alternatively, the design function may transmit the security template to the set of network functions.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
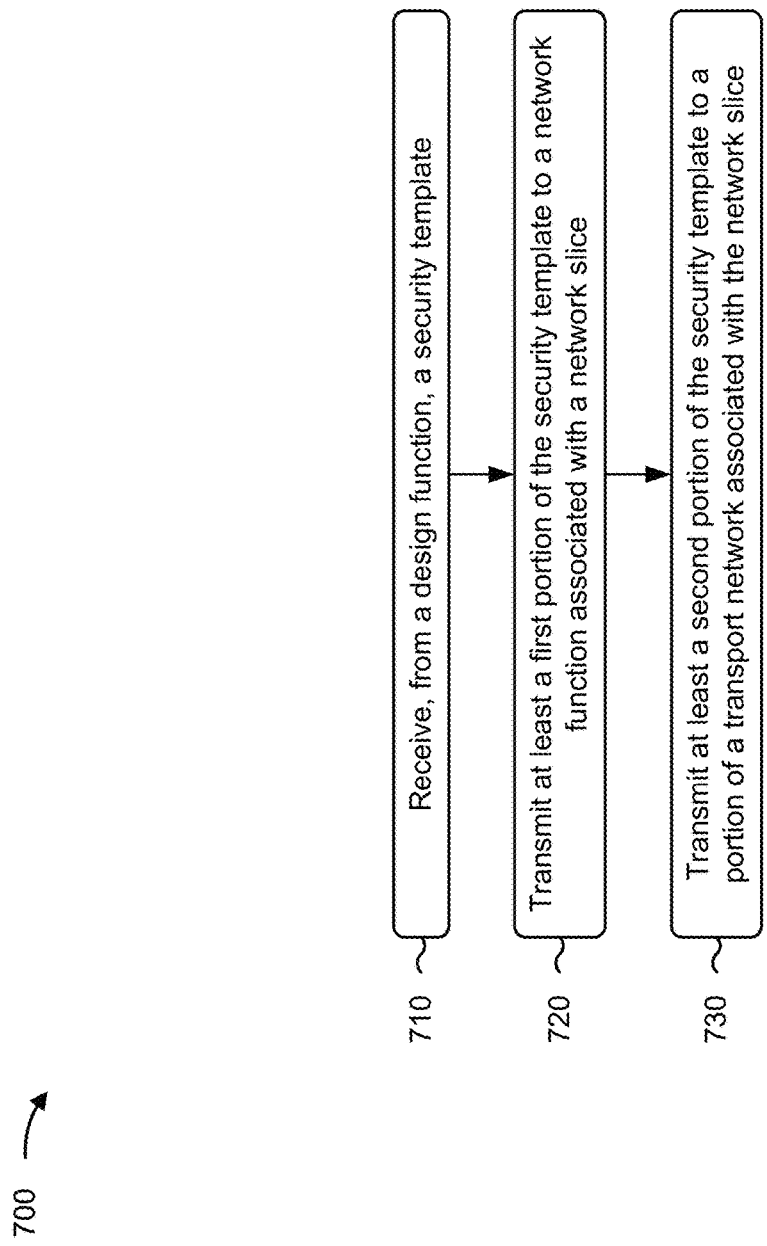
FIG. 7 is a flowchart of an example process associated with network security conflict resolution.

FIG. 7 is a flowchart of an example process 700 associated with network security conflict resolution. In some implementations, one or more process blocks of FIG. 7 may be performed by a service orchestrator (e.g., service orchestrator 115). In some implementations, one or more process blocks of FIG. 7 may be performed by another device or a group of devices separate from or including the service orchestrator, such as a network function 105, a design function 110, a transport network 155, and/or a device implementing a software-defined network 405. Additionally, or alternatively, one or more process blocks of FIG. 7 may be performed by one or more components of device 500, such as processor 520, memory 530, input component 540, output component 550, and/or communication component 560.

As shown in FIG. 7, process 700 may include receiving, from a design function, a security template (block 710). For example, the service orchestrator may receive, from a design function, a security template, as described herein. In some implementations, process 700 includes transmitting, to the design function, a set of security policy indications associated with a set of network functions including the network function, such that the service orchestrator receives the security template in response to the set of security policy indications.

As further shown in FIG. 7, process 700 may include transmitting at least a first portion of the security template to a network function associated with a network slice (block 720). For example, the service orchestrator may transmit at least a first portion of the security template to a network function associated with a network slice, as described herein. In some implementations, process 700 includes receiving an indication that the network function will be used for the network slice, such that the service orchestrator transmits the first portion of the security template in response to the indication. Additionally, or alternatively, process 700 includes determining that the first portion of the security template is associated with a current security policy of the network function, such that the service orchestrator transmit the first portion of the security template based on the first portion being associated with the current security policy of the network function.

As further shown in FIG. 7, process 700 may include transmitting at least a second portion of the security template to a portion of a transport network associated with the network slice (block 730). For example, the service orchestrator may transmit at least a second portion of the security template to a portion of a transport network associated with the network slice, as described herein. In some implementations, process 700 includes determining that the second portion of the security template is associated with a security policy implemented by a tenant in the transport network, such that the service orchestrator transmit the second portion of the security template based on the second portion being associated with the security policy implemented by the tenant.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   identifying, at a design component of a device, a plurality of network slices, wherein each network slice includes at least a subset of a set of network functions,
      wherein the set of network functions includes at least one of a user plane function, a session management function, an access and mobility management function, an authentication server function, a policy control function, a charging function, or a network slice selection function;
   generating, at the design component, at least one graph representing the plurality of network slices;
   simulating, using the at least one graph, traffic through the plurality of network slices;
   determining, at the design component, a security template based on at least one conflict detected based on the simulating; and
   transmitting the security template to resolve the at least one conflict.

2. The method of claim 1,
   further comprising:
   receiving a set of registration messages that includes a set of security policy indications.

3. The method of claim 1, further comprising:
   storing the at least one graph in a memory associated with the design component.

4. The method of claim 1,
   wherein transmitting the security template comprises:
   transmitting the security template to a transport network associated with the plurality of network slices.

5. The method of claim 1,
   wherein transmitting the security template comprises:
   transmitting the security template to the set of network functions.

6. The method of claim 1,
   wherein determining the security template comprises:
   constructing a compound security template that indicates a set of priorities associated with the set of network functions.

7. The method of claim 1,
   wherein determining the security template comprises:
   constructing a compound security template that indicates a set of priorities associated with a set of corresponding security policy indications.

8. The method of claim 7,
wherein the set of security policy indications is associated with a single type of security policy.

9. The method of claim 7,
wherein the set of security policy indications is associated with a plurality of types of security policies.

10. The method of claim 1, wherein:
determining the security template comprises constructing the security template, based on at least one of a set of security policy indications; and
transmitting the security template comprises transmitting the security template to a new network function.

11. A device, comprising:
one or more processors configured to:
run a simulation of traffic through a plurality of network slices, wherein each network slice includes at least a subset of a set of network functions,
wherein the set of network functions includes at least one of a user plane function, a session management function, an access and mobility management function, an authentication server function, a policy control function, a charging function, or a network slice selection function;
determine a security template based on at least one conflict detected based on the simulation of traffic; and
transmit the security template for resolving the at least one conflict.

12. The device of claim 11,
wherein the one or more processors are further configured to:
receive a registration message associated with a new network function; and
transmit, to the new network function, the security template.

13. The device of claim 11,
wherein the one or more processors are further configured to:
receive a security policy indication associated with a new network function;
update the simulation of traffic to include the new network function; and
update the security template based on the update to the simulation of traffic.

14. The device of claim 11,
wherein the one or more processors are further configured to:
receive a set of registration messages that includes a set of security policy indications.

15. The device of claim 11,
wherein at least one of the set of network functions is associated with two or more security policy indications of a set of security policy indications, and the security template prioritizes one of the two or more security policy indications over another of the two or more security policy indications.

16. A non-transitory computer-readable medium storing a set of instructions, the set of instructions comprising:
one or more instructions that, when executed by one or more processors of a device, cause the device to:
receive, from a design component of a device, a security template;
transmit at least a first portion of the security template to a network function, from a set of network functions, associated with a network slice,
wherein the set of network functions includes at least one of a user plane function, a session management function, an access and mobility management function, an authentication server function, a policy control function, a charging function, or a network slice selection function; and
transmit at least a second portion of the security template to a portion of a transport network associated with the network slice.

17. The non-transitory computer-readable medium of claim 16,
wherein the one or more instructions, when executed by the one or more processors, further cause the device to:
receive an indication that the network function will be used for the network slice,
wherein the first portion of the security template is transmitted in response to the indication.

18. The non-transitory computer-readable medium of claim 16,
wherein the one or more instructions, when executed by the one or more processors, further cause the device to:
transmit, to the design component, a set of security policy indications associated with the set of network functions including the network function,
wherein the security template is received in response to the set of security policy indications.

19. The non-transitory computer-readable medium of claim 16,
wherein the one or more instructions, that cause the device to transmit the first portion of the security template, cause the device to:
determine that the first portion of the security template is associated with a current security policy of the network function,
wherein the first portion of the security template is transmitted based on being associated with the current security policy of the network function.

20. The non-transitory computer-readable medium of claim 16,
wherein the one or more instructions, that cause the device to transmit the second portion of the security template, cause the device to:
determine that the second portion of the security template is associated with a security policy implemented by a tenant in the transport network,
wherein the second portion of the security template is transmitted based on being associated with the security policy implemented by the tenant.

* * * * *